United States Patent [19]
Tofflemire et al.

[11] Patent Number: 5,092,541
[45] Date of Patent: Mar. 3, 1992

[54] SUPPORT ARRANGEMENT FOR AIRCRAFT PALLETS

[75] Inventors: David C. Tofflemire, Downey; Joseph C. Tocco, Carson, both of Calif.

[73] Assignee: Tofflemire Freight Service, Downey, Calif.

[21] Appl. No.: 638,090

[22] Filed: Jan. 7, 1991

[51] Int. Cl.$^5$ .............................................. B64D 9/00
[52] U.S. Cl. ............................ 244/118.1; 108/55.1; 206/386
[58] Field of Search ............... 244/118.1, 118.2, 137.1; 108/55.1, 55.3, 56.3; 206/386; 220/1.5

[56] References Cited

U.S. PATENT DOCUMENTS

| | | | |
|---|---|---|---|
| 2,938,686 | 5/1960 | Van Winkle et al. | 244/118.1 |
| 4,046,277 | 9/1977 | Morrison | 244/118.1 X |
| 4,824,050 | 4/1989 | Courter | 244/118.1 |

FOREIGN PATENT DOCUMENTS

| | | | |
|---|---|---|---|
| 0369575 | 5/1990 | European Pat. Off. | 244/118.1 |
| 2186257 | 8/1987 | United Kingdom | 244/118.1 |

*Primary Examiner*—Joseph F. Peters, Jr.
*Assistant Examiner*—Carla Mattix
*Attorney, Agent, or Firm*—Ladas & Parry

[57] ABSTRACT

An apparatus for attachment to a standard aircraft pallet such that the resulting combination can accommodate as much as 70% more volume. The invention comprises a support apparatus having the form of a pair of platform extension "wings", preferably detachable, attached to the lateral edges of a standard aircraft pallet. The extension wings provide a raised platform surface for carrying additional loads beyond the load normally accommodated on the planar surface of the pallet. The construction of the extension wings is such that the additional cargo support surface is provided above and laterally offset from the volume directly above the surface of the pallet. The wings have a generally inverted L-shaped cross section formed by vertical support members and horizontal support members. The bottoms of the vertical support members are attached to an edge of an aircraft pallet with the horizontal support members extending in a direction outwardly from the aircraft pallet edge. A securing strap or cable is attached between the bottom central portion of the extension wing and an anchor in the center of the pallet edge to prevent inadvertent removal of the bottoms of the vertical support members from the pallet edge.

8 Claims, 2 Drawing Sheets

SUPPORT ARRANGEMENT FOR AIRCRAFT PALLETS

BACKGROUND OF THE INVENTION

1. Field of the Invention

This invention relates to the field of aircraft pallets, and more particularly to an extension platform which is attachable to a standard aircraft pallet for accommodating more volume on the pallet.

2. Brief Description of the Prior Art

One type of standard aircraft pallet of the prior art comprises a rectangular, substantially planar, metallic sheet with a slotted attachment strip around its periphery. The attachment strip is typically a thick, rigid metal structure having a series of adjacent vertically oriented slots therein for receiving an anchoring device in any of such slots for tieing down cargo netting.

In use, such prior art aircraft cargo pallets can accommodate a load which will fit within a volume having limits defined by imaginary vertical walls extending upwardly from the peripheral edges of the pallet. The load is then secured by a cargo netting with anchors attached to the peripheral attachment strip, and the entire loaded pallet is conveyed to the interior of the aircraft for transportation to its destination.

While such pallets have proven to be adequate for the intended purpose, when they are stowed inside the aircraft, the volume on either lateral side of the pallet, between the netted cargo and the aircraft fuselage, is wasted space or must be filled with smaller loose pieces of cargo. Such additional space may result, for example, from the natural curvature of the fuselage of the aircraft when the pallet is stowed below the centerline of the fuselage.

There is thus a need in the field of aircraft pallets for an improved pallet that, when required, will accommodate additional load volume which would extend beyond the edges of a standard aircraft pallet and fill the void between the lateral edges of the pallet and the aircraft fuselage. The present invention fulfills this need.

SUMMARY OF THE INVENTION

The present invention provides an apparatus for removable attachment to a standard aircraft pallet such that the resulting combination can accommodate as much as 20% more volume than can a standard aircraft pallet that is not equipped with the improvement according to the present invention.

Basically, the invention relates to a support apparatus having the form of an extension "wing" attached to the lateral edge of a standard aircraft pallet. The extension wing provides a raised platform surface for carrying additional load volumes beyond the load volume normally accommodated on the planar surface of the pallet. The construction of the extension wing is such that the additional cargo support surface is provided above and laterally offset from the volume directly above the surface of the pallet, and therefore the additional cargo support surface does not diminish the volume normally used for containing cargo.

The extension wing has a generally inverted L-shaped cross section formed by vertical support means and horizontal support means. The bottoms of the vertical support means are attached to an edge of an aircraft pallet with the horizontal support means extending in a direction outwardly from the aircraft pallet edge.

In a preferred embodiment of the invention, a second one of the extension wings is attached to an edge of the aircraft pallet opposite that upon which the first-mentioned extension wing is attached. This arrangement optimizes the usage of space on either side of the pallet.

In another aspect of the invention, means are provided for preventing the extension wing from pivoting about its attachment point on the pallet in a direction outwardly of the pallet edge.

In a preferred embodiment of the invention, the means for preventing pivoting of the extension wing comprises a flexible cord. The cord is connected at one of its ends to the elevated horizontal support means, and the other end of the flexible cord is fixed to the aircraft pallet at a location inwardly of the aircraft pallet edge upon which the extension wing is mounted.

In another aspect of the invention, the end of the flexible cord connected to the horizontal support means passes through an aperture on the inner edge of the horizontal support means and terminates at a connecting means at the outer edge of the horizontal support means.

In another aspect of the invention, a grommet is inserted in the aperture in the inner edge of the horizontal support means, and the flexible cord passes through the grommet which provides a smoother, or softer, bending edge for the flexible cord as it passed through the inner edge of the horizontal support means.

A standard aircraft pallet has a series of vertically oriented slots about its periphery defining selectable tie-down positions for securing cargo netting. In another aspect of the present invention, the means provided for attaching the bottoms of the vertical support means of the extension wing to an edge of the aircraft pallet includes a plurality of downwardly directed pins fixed to the bottom of the vertical support means and sized to be snugly fit into corresponding slots in the standard aircraft pallet attachment strip. Further, the means for fixing one end of the flexible cord to the pallet comprises an anchor device secured in one of the slots in the standard aircraft pallet along an edge of the pallet which is perpendicular to the edge on which the extension wing is attached. The attachment of the wing to the pallet is such that simple removal of the anchors (two per wing) will permit the wings to be lifted upwardly for quick disassembly. Thus, a major feature of the invention is that the wings are detachably mounted on the pallet, permitting standard pallets to be used when required and, alternatively, pallets with wings when required. The time required to attach or detach a pair of wings is only a few minutes.

To secure the wing against inadvertent removal from the pallet slots, a short strap or cable can be attached at one end to the central lower portion of the extension wing, and at its other end to another standard anchor device secured in a pallet slot near the center of the pallet edge.

BRIEF DESCRIPTION OF THE DRAWINGS

The invention will now be describe by way of example with reference to the accompanying drawings, in which.

DESCRIPTION OF THE PREFERRED EMBODIMENT

Figure 1:
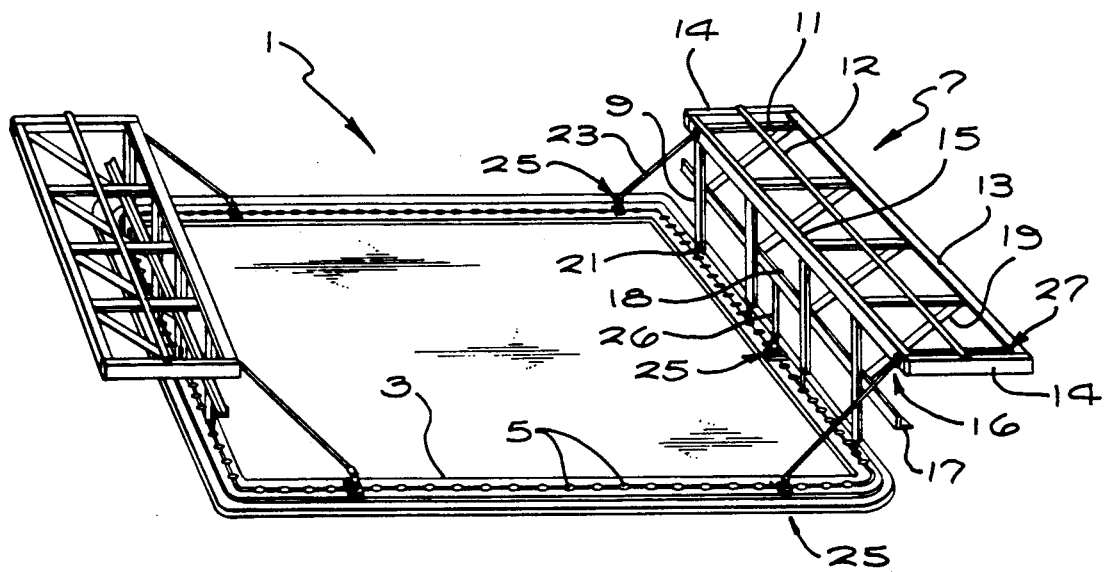
FIG. 1 is a perspective view of an aircraft pallet with extension wings at opposite ends of an aircraft pallet.

There are a variety of standard pallets used for supporting or containing cargo. FIG. 1 shows one type of aircraft pallet 1 seen as a flat rectangular metal surface for supporting the cargo and an attachment strip 3 extending continuously around the periphery of the aircraft pallet 1. The attachment strip 3 is provided for attaching standard tie-down anchors into slots 5. The cargo is secured in place by cargo netting, the lower extremities of which are anchored in slots 5 in a known manner. A sufficient number of adjacent slots 5 is provided in attachment strip 3 so that the netting can be anchored at any one of a variety of locations around the periphery of the pallet 1.

To increase the volume of cargo that can be carried by the pallet 1, the present invention contemplates the provision of a pair of platform support extension wings 7 mounted to opposite ends of the pallet 1. The extension wings 7 have a generally inverted L-shaped cross section formed by vertical support members 9 and horizontal support members 11. An outer edge member 13 and an inner edge member 15 connect the vertical and horizon&:al support member 9 and 11 to form the L-shaped extension wing. For added support, a lower cross member 17 is connected to each vertical support member near the bottom thereof, and a number of angled support members 19 extend between the lower cross member 17 and the outer edge member 13. An elongated filler bar 12 can be secured to the center of the extension wing and extend longitudinally thereof in the center of each horizontal support means 11. Filler bar 12 thus, not only provides additional strength to the extension wing, but fills in the large gaps between horizontal support members 11 so as to accommodate smaller cargo boxes on the horizontal surface of the extension wing 7. A pair of end caps 14 are provided to box in the ends of the horizontal support surface.

All of the constructional elements comprising the extension wing 7 can form an integral unit by means of welding appropriate lengths of angled aluminum (or other strong lightweight material), sheets, and/or rods at each connection point, or the individual members can be secured by means of nuts and bolts, rivets, and any other means of connection which would be acceptable under the conditions of rough handling and heavy cargo as is typical in the aircraft cargo transportation industry.

It should be understood that the example of the structure shown in the drawings represents only one type of construction that could be applied in the manufacture of the extension wings 7. Alternative constructions can include support members of circular or rectangular cross section, and the upper horizontal support surface of each extension wing 7 could include a sheet-like covering. A similar sheet-like covering could also be provided along the inner edges of the vertical support members 9 to avoid any possibility of small cargo containers passing through the open construction of the extension wing 7 shown in FIG. 1.

While a single extension wing 7 can be provided for increasing the volume of the transportable cargo on pallet 1, it is preferable to provide a pair of such extension wings 7 on opposite edges of the pallet.

Figure 2:
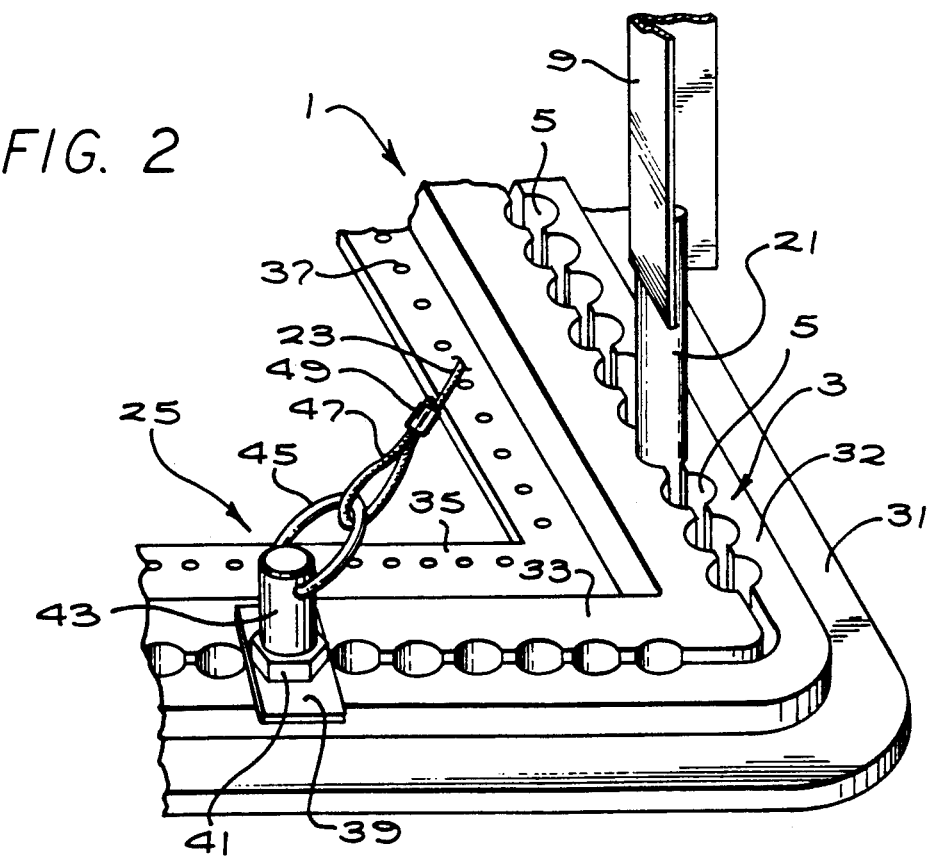
FIG. 2 is a close up view of one corner of the aircraft pallet showing the manner in which the extension wing is mounted on the aircraft pallet.

As best seen in FIG. 2, the bottoms of each vertical support member 9 are provided with downwardly directed pins 21. Pins 21 are sized to fit snugly within the vertically oriented slots 5 spaced linearly along the peripheral edge of the pallet 1 in the center of attachment strip 3.

Figure 3:
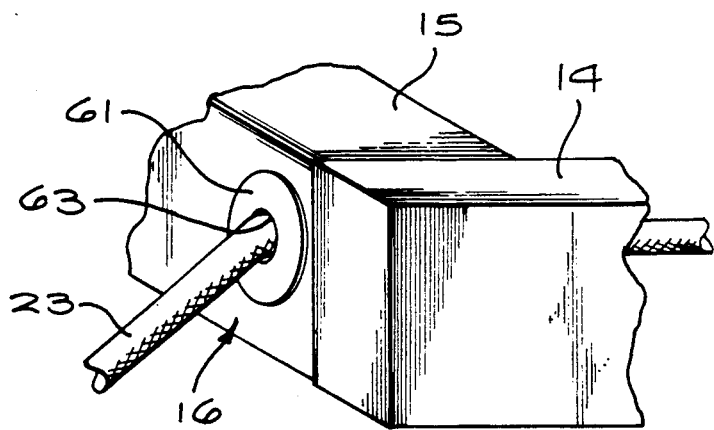
FIG. 3 shows the details of the flexible cable support passing through the inner edge member of the extension wing.

Although the cooperation between the pins 21 and slots 5 secures the bottoms of the vertical support members 9 against movement laterally, the pins 21 may not, in all applications, provide sufficient support for preventing pivoting of the vertical support members 9 about the bottoms thereof. In some applications, either pins 21 would have a tendency to slip out of slots 5, or pins 21 would bend under the influence of heavy cargo positioned on the horizontal upper surface of the extension wing 7. To prevent the pivoting of the extension wing 7 outwardly of the edges of the aircraft pallet 1, a flexible tension cord support 23 is provided. The lower end of cord 23 is fixed to an anchor device 25 contained within a selected slot 5 in a manner in which cargo netting anchors are secured. Any known anchor device 25 can be used, provided it is of a type which has high strength and a secure and reliable connection to the pallet by means of slots 5. The upper end of the flexible cord support 23 passes through a coupler 16 near the extremity of inner edge member 15 as best seen in FIG. 3. Coupler 16 provides a means for guiding the flexible cord 23 through an aperture 63 in inner edge member 15, and it may be prevented from shear damage at the corners of aperture 63 by the provision of a grommet 61.

While the forces acting to support extension wing 7 are determined, in part, by the location of coupler 16 on the inner edge member 15, the extremity of flexible cord 23 is connected to extension wing 7 at the outer edge member 13 by a connector 27. This feature improves the integrity of construction and reduces the tension stress on horizontal support member 11.

Due to the connection of the flexible cord support 23 at the far end of the extension wing (i.e. at outer edge member 13), a great amount of compressive force is applied to the structure at the extreme ends of the horizontal platform. To give added strength to the platform and to accommodate such stress, end caps 14 are provided. These structural elements box in the ends of the horizontal platform near the stress points caused by the tension on cords 23 and can be in the form of end caps, as shown, or merely metallic plates welded to the ends of inner and outer edge members 15 and 13, respectively.

Further details of the standard aircraft pallet 1 and the means for connecting the extension wings 7 thereto are shown in FIG. 2. As mentioned, the bottom surface of the aircraft pallet is a substantially rectangular flat platelike unit having a base plate 31 upon which attachment strip 3 is secured.

The slots provided in attachment strips 3 serve to separate the strip into an outer strip part 32 and an inner strip part 33. A flange 35 is provided or the inner peripheral edge of attachment strip 3 and is used to secure the attachment strip 3 to the base plate 31 by means of bolts or rivets 37.

The anchor device 25 shown in FIG. 2, by way of example only, comprises a rectangular spacer/washer 39, a securing nut 41, and a boss 43 having an aperture therethrough for accommodating a ring through which the end of flexible cord 23 is looped. The extreme end 47 of cord 13 is attached to the main length of cord 23 by means of any commonly known clamp 49.

Figure 4:
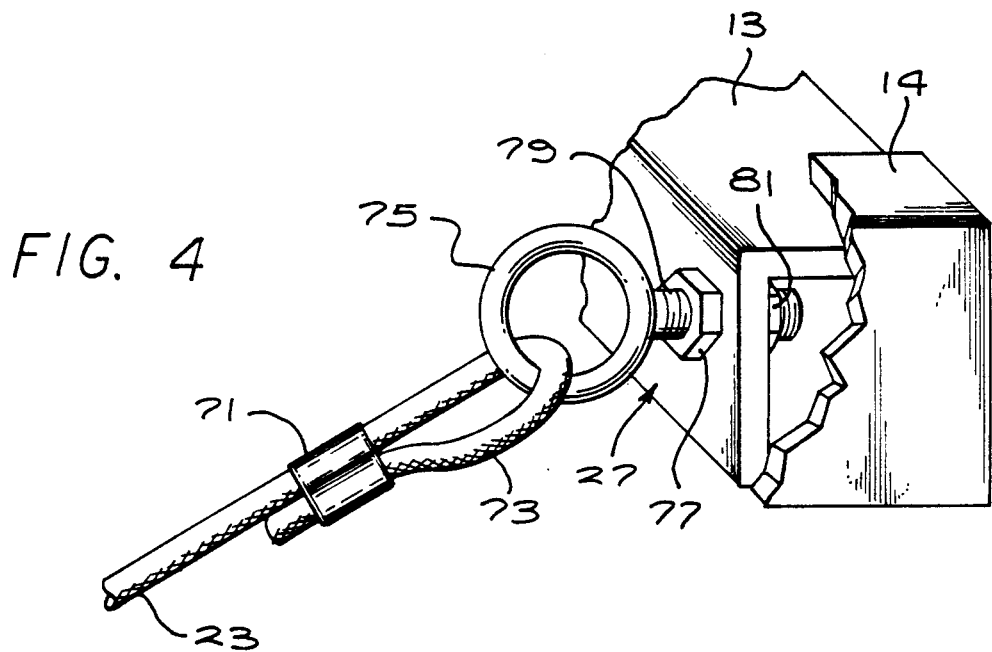
FIG. 4 shows the means for connecting the end of the flexible cable support to the outer edge of the extension wing.

The details of the connection of flexible cord 23 to the outer edge member 13 is best seen in FIG. 4. There, the upper extreme end of cord 23 has its end 73 secured to the main length of cord 23 by clamp 71. A screweye 75 is secured to outer edge member 13 by means of a pair of nuts 77, 81 locked against member 13 on either side thereof by means of the threaded shaft 79.

A flexible cord 23, anchor device 25, coupler 16 and connecting means 27 are provided on each side of the extension wing 7 for the obvious structural benefits this would produce.

Figure 5:
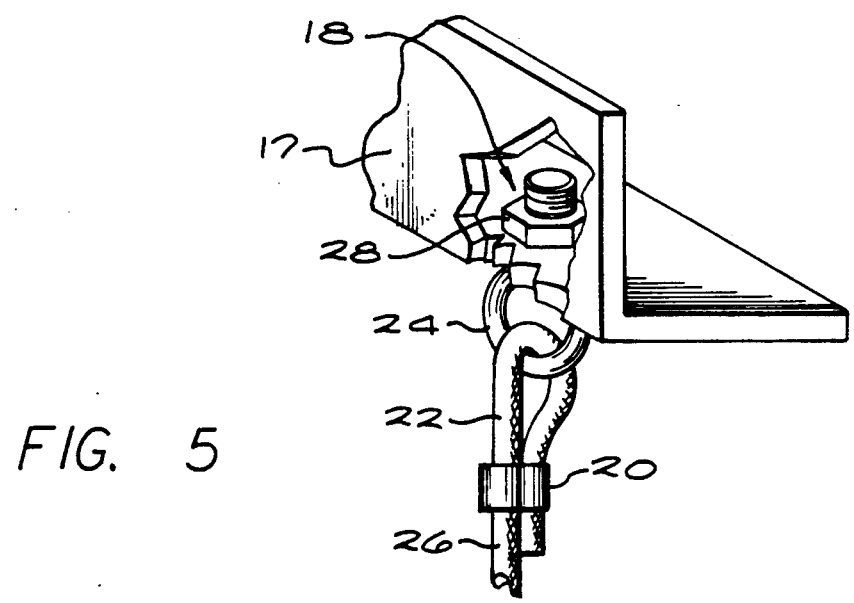
FIG. 5 shows the connection of a safety strap or cable to the lower central portion of an extension wing.

Further details of the connection 18 of the safety strap or cable 26 to the center of lower cross member 17 can be seen in FIG. 5. There, the end 22 of cable 26 passes through a screweye 24 and is clamped to the main body of cable 26 by a clamp 20. Screweye 24 is secured to member 17 by a nut 28. The lower end of cable 26 attaches to the pallet attachment strip 3 by an anchor 25 of a type previously described.

It can be appreciated that the extension wings 7 do not occupy any of the surface volume over the cargo-carrying area of the pallet 1. Furthermore, not only can additional cargo be stored on the extension wing platforms 7 themselves, but additional layers of cargo containers can be added to the top of the cargo stack between the extension wings 7. That is, even the normal cargo storage volume of the pallet 1 has increased capacity as compared to a pallet without such extension wings. Thus extension wings 7 provide an unexpected increase in utility, since it improves the stability for stacking even greater heights of cargo containers within the volume on pallet 1. As an example, even using the proportions approximated in FIG. 1 as between the extension wings 7 and aircraft pallet 1, the available volume for cargo containers is increased by approximately 20%.

Since the extension wings can be made from lightweight material, such as magnesium, aluminum alloys, high strength polymers and composite materials, and since the construction of the extension wings 7 can have a rather open design, the total weight of each wing adds only about forty pounds to the overall weight of the loaded pallet for a pallet having dimensions on the order of 60.4"×125" (153.4 cm×317.5 cm). This additional forty pounds of weight per extension wing 7 is relatively rather insignificant and is clearly more than justified when considering the weight accommodation on a pallet of this size is about 7,000 pounds maximum gross weight. Of this weight, approximately 300 pounds per vertical support member 9 can be supported by the extension wing which would typically be mounted on the 60.4" edge of the pallet. In the embodiment shown, with four vertical support members 9, a total of 1200 pounds of cargo can be supported by each wing.

It is important to recognize that the present invention can be attached to a standard aircraft pallet without any modification whatsoever to the pallet. The attachment strip 3 and slots 5, normally used to hold down cargo nets, are used without modification to attach the bottoms of the vertical support members 9 of the extension wings 7 and one end of cable 23. A cargo netting may still be provided without deprivation, since only three slot position are used in the mounting of each wing on the pallet. Accordingly, the number of slots used in the manufacture of the aircraft pallet 1 need not be increased.

It will be apparent from the foregoing that only a single example of the design for an extension wing 7 has been described and shown in the drawings. While certain alternative forms of the invention have been described, various modifications can be made without departing from the spirit and scope of the invention. Accordingly, it is not intended that the invention be limited to the embodiment shown or described, but rather by the appended claims.

We claim:

1. A support apparatus for use with aircraft pallets of the type having a series of vertically oriented slots on its periphery, comprising:
    an extension wing having a generally inverted L-shaped cross section formed by an elongated vertical support means rigidly connected to an elongated horizontal support means;
    attachment means for removably attaching the bottoms of said
    vertical support means to an edge of an aircraft pallet with said horizontal support means extending from the top of said vertical support means in a direction outwardly from the aircraft pallet edge, said attachment means comprising a plurality of downwardly directed pins fixed to the bottom of, and in the plane of, said vertical support means, said pins being removably received in ones of said slots in the periphery of the pallet; and
    tension means for counteracting a tendency of said extension wing to pivot, about said attachment means, in a direction outwardly of the pallet edge under the influence of heavy cargo positioned on said horizontal support means.

2. The support apparatus as claimed in claim 1, comprising:
    a second extension wing attached to an edge of the aircraft pallet opposite that upon which said first-mentioned extension wing is attached.

3. The support apparatus as claimed in claim 1, wherein said tension means comprises:
    a flexible cord;
    means for connecting one end of said cord to said horizontal support means; and
    means for removably attaching the other end of said cord to the aircraft pallet at a location inwardly of the aircraft pallet edge.

4. The support apparatus as claimed in claim 3, wherein:
    said means for connecting one end of said cord is located at the outer edge of said horizontal support means; and
    said horizontal support means has an aperture in its inner edge through which said cord passes and extends to, and terminates at, said means for connecting.

5. The support apparatus as claimed in claim 4, including a grommet in said aperture through which said cord passes.

6. The support apparatus as claimed in claim 3, wherein
    said means for removably attaching said other end of said flexible cord comprises an anchor device secured in one of the vertically oriented slots in the standard aircraft pallet along an edge of the pallet which is perpendicular to the edge on which said extension wing is attached.

7. The support apparatus as claimed in claim 1, comprising means for preventing inadvertent removal of the bottoms of said vertical support means from said vertically oriented slots on the edge of the aircraft pallet.

8. The support apparatus as claimed in claim 7, wherein said means for preventing inadvertent removal comprises;

a removable cable;

an anchor device secured to the aircraft pallet edge at approximately the center thereof; and a coupler attached to the lower central portion of said vertical support means;

whereby said removable cable extends, in the plane of said vertical support means, between said anchor device and said coupler and connects to said anchor device at one end and said coupler at the other end.

* * * * *